US012614871B2

(12) United States Patent
Huang et al.

(10) Patent No.: US 12,614,871 B2
(45) Date of Patent: Apr. 28, 2026

(54) CONNECTION CABLE WITH DETACHABLE PROTECTION COVER

(71) Applicants: KUNSHAN AMPHENOL ZHENGRI ELECTRONICS CO., LTD., Kunshan City (CN); AMPHENOL LTW TECHNOLOGY CO., LTD., New Taipei City (TW)

(72) Inventors: Shang-Yen Huang, New Taipei City (TW); Wei-Wen Chan, New Taipei City (TW); Yu-Wei Chou, New Taipei City (TW)

(73) Assignees: KUNSHAN AMPHENOL ZHENGRI ELECTRONICS CO., LTD., Kunshan City (CN); AMPHENOL LTW TECHNOLOGY CO., LTD., New Taipei City (TW)

( * ) Notice: Subject to any disclaimer, the term of this patent is extended or adjusted under 35 U.S.C. 154(b) by 321 days.

(21) Appl. No.: 18/528,704

(22) Filed: Dec. 4, 2023

(65) Prior Publication Data

US 2025/0132516 A1 Apr. 24, 2025

(30) Foreign Application Priority Data

Oct. 18, 2023 (TW) ................................ 112139758

(51) Int. Cl.
*H01R 13/453* (2006.01)
*H01R 12/77* (2011.01)

(52) U.S. Cl.
CPC ....... *H01R 13/4538* (2013.01); *H01R 12/771* (2013.01)

(58) Field of Classification Search
CPC .......................... H01R 13/4538; H01R 12/771
(Continued)

(56) References Cited

U.S. PATENT DOCUMENTS

2023/0112949 A1* 4/2023 Guo .................. H01R 13/6335 439/352

FOREIGN PATENT DOCUMENTS

| | | | |
|---|---|---|---|
| JP | 2003346996 A | | 12/2003 |
| JP | 2020140779 A | | 9/2020 |
| TW | M397052 U | * | 1/2011 |

OTHER PUBLICATIONS

Office Action dated Oct. 8, 2024 of the corresponding Japan patent application No. 2023-212193.

* cited by examiner

*Primary Examiner* — Tulsidas C Patel
*Assistant Examiner* — Jeffrey Mountain
(74) *Attorney, Agent, or Firm* — HDLS IPR SERVICES; Chun-Ming Shih

(57) ABSTRACT

A connection cable (1) includes an insulation seat (10), a circuit board (20) and a protection cover (30). The insulation seat (10) includes a main body (11) formed with a slot (110) and a conduction opening (111). The conduction opening (111) is connected to the slot (110) and located on the bottom side of the main body (11). The circuit board (20) includes a substrate (21) and a plurality of conductive portions (22) disposed on the substrate (21). The substrate (21) is inserted in the slot (110). The conductive portions (22) are exposed from the conduction opening (111). The protection cover (30) is combined on the main body (11) to shield the (Continued)

conduction opening (111). The protection cover (30) is pushed by the dock connector (2) to expose the conduction opening (111) and to be separated from the main body (11).

11 Claims, 11 Drawing Sheets

(58) Field of Classification Search
USPC ............................................................ 439/77
See application file for complete search history.

CONNECTION CABLE WITH DETACHABLE PROTECTION COVER

BACKGROUND OF THE DISCLOSURE

Technical Field

The technical field relates to a connection cable, and more particularly relates to a connection cable with a detachable protection cover.

DESCRIPTION OF RELATED ART

A connection cable is an electronic component used for linking various parts, devices, or systems. Furthermore, the connection cable used in docking facilitates electrical connections and data transmission between devices, systems, or components. Therefore, the connection cable plays a crucial role in modern technology and communication.

Furthermore, a specialized type of cable or connector available in the market is constructed using flexible printed circuits (FPCs), which may be utilized in confined spaces or when flexibility and bendability are required.

The metal conductive portions (gold fingers) of the mentioned flexible printed circuit connector may be exposed on the bottom side of the insulation seat to enable electrical connections during docking. Nonetheless, the exposed metal conductive portions may be inadvertently touched by users, leading to potential damage. Moreover, there is a risk of damage when docking with the board-end connector.

In view of the above drawbacks, the inventor proposes this disclosure based on his expert knowledge and elaborate researches in order to solve the problems of related art.

SUMMARY OF THE DISCLOSURE

One objective of this disclosure is to provide a connection cable with a detachable protection cover to prevent the conductive portions of the connection cable from being touched and damaged, thereby enhancing the reliability, durability, and safety of the connection cable.

This disclosure is a connection cable including an insulation seat, a circuit board and a protection cover. The insulation seat includes a main body formed with a slot and a conduction opening. The conduction opening is connected to the slot and located on the bottom side of the main body. The circuit board includes a substrate and a plurality of conductive portions disposed on the substrate. The substrate is inserted into the slot. The conductive portions are exposed from the conduction opening. The protection cover is combined on the main body to shield the conduction opening. The protection cover is pushed by the dock connector to reveal the conduction opening and to be separated from the main body.

In one embodiment of this disclosure, the protection cover includes two sliding covers arranged side by side, each sliding cover includes a shutter and a clasp arm connected to the shutter, the clasp arm is bent and extends from one side of the shutter to form an insertion space, and two sides of the main body are inserted in the insertion spaces of two sliding covers and are pressed by the clasp arms.

In one embodiment of this disclosure, each sliding cover includes a hook disposed on a side facing the insertion space thereof, a plurality of grooves is disposed on the bottom side of the main body, and each sliding cover is positioned on the main body through the hook be engaged with the groove.

In one embodiment of this disclosure, each sliding cover includes a baffle that is bent and extends from the shutter. The baffle is spaced apart from one side of the clasp arm and extends along an insertion direction of the main body.

In one embodiment of this disclosure, each sliding cover includes a tab connected to the baffle and protruding from a side of the shutter facing the main body.

In one embodiment of this disclosure, the protection cover includes a shutter and two clasp arms connected to the shutter, each clasp arm is bent and extends from one side of the shutter and forms an insertion space, and the main body is inserted in the insertion space and pressed by the two clasp arms.

In one embodiment of this disclosure, the protection cover includes two elastic plates connected to the shutter, and the hooks are disposed on two elastic plates.

In one embodiment of this disclosure, the protection cover includes two blocking frames that are bent and extend from the shutter. Two blocking frames are spaced apart from one side of the two clasp arms, and each blocking frame and clasp arm collectively form an insertion space.

In one embodiment of this disclosure, the protection cover includes two guiding pieces arranged on two blocking frames, and one side of each guiding piece protrudes from one side of each blocking frame.

In comparison with the related art, the conductive portions of the connection cable of this disclosure are exposed from the conduction opening on the bottom of the insulation seat. The protection cover is coupled to the main body to shield the conduction opening, thereby mitigating the risk of the conductive portions of the connection cable being inadvertently touched or damaged. Moreover, when the connection cable is inserted into the dock connector, the protection cover may be pushed to reveal the conductive portions to realize the connection with the terminals of the dock connector, thereby enhancing the reliability, durability, and safety of the connection cable.

BRIEF DESCRIPTION OF THE DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
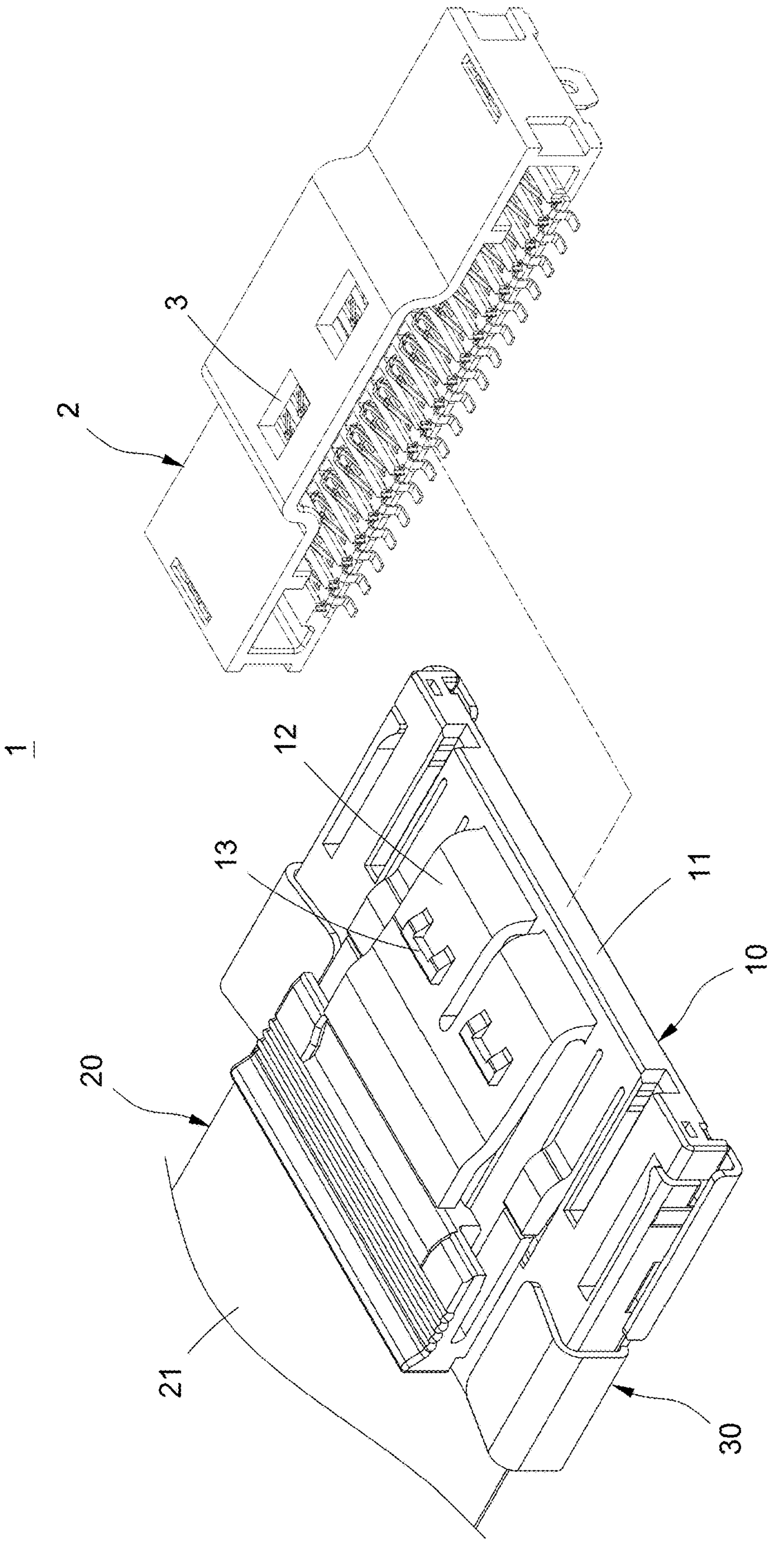
FIG. 1 is a schematic view illustrating the docking of the connection cable in this disclosure.
Figure 2:
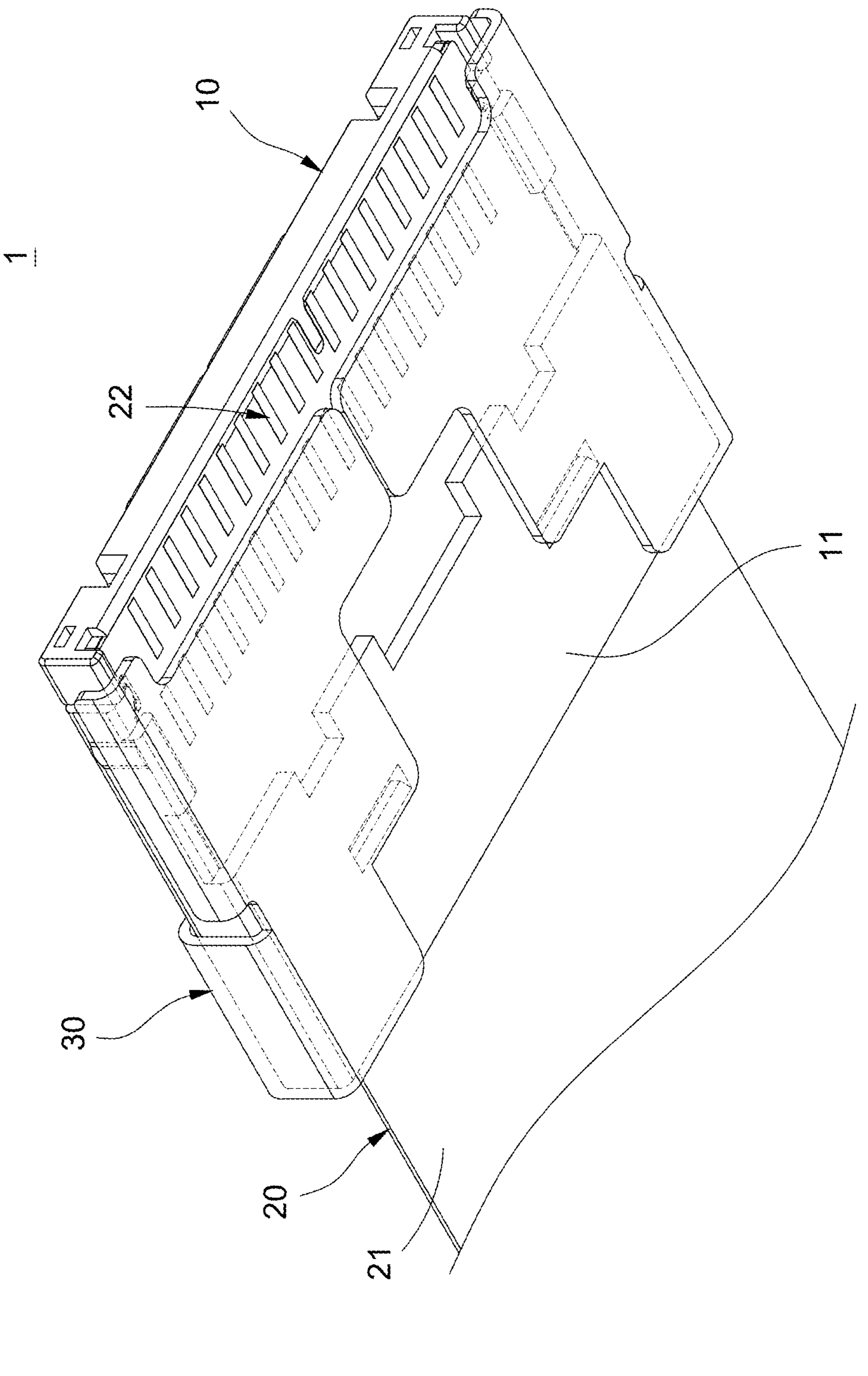
FIG. 2 is a perspective schematic view of the connection cable in this disclosure.

Please refer to FIG. 1 and FIG. 2, which depict a schematic view illustrating the docking of the connection cable and a perspective schematic view of the connection cable in this disclosure. This disclosure is a connection cable 1 for docking with a dock connector 2. In some embodiments, the dock connector 2 may be disposed on a circuit board, but it is not limited thereto.

In this embodiment, the connection cable 1 includes an insulation seat 10, a circuit board 20 and a protection cover 30. The circuit board 20 includes a substrate 21 and a plurality of conductive portions 22 disposed on the substrate 21. The substrate 21 is combined in the insulation seat 10. The conductive portions 22 are exposed from the bottom of the insulation seat 10.

Moreover, the protection cover 30 is combined on the insulation seat 10 to shield the conductive portions 22 located on the bottom of the insulation seat 10.

In one embodiment of this embodiment, the insulation seat 10 includes a main body 11, an elastic arm 12 and a bump 13 disposed on the elastic arm 12. A card slot 3 is disposed on the dock connector 2. When the connection cable 1 is docked with the dock connector 2, the connection cable 1 combines with the dock connector 2 through the bump 13 being engaged with the card slot 3.

Figure 3:
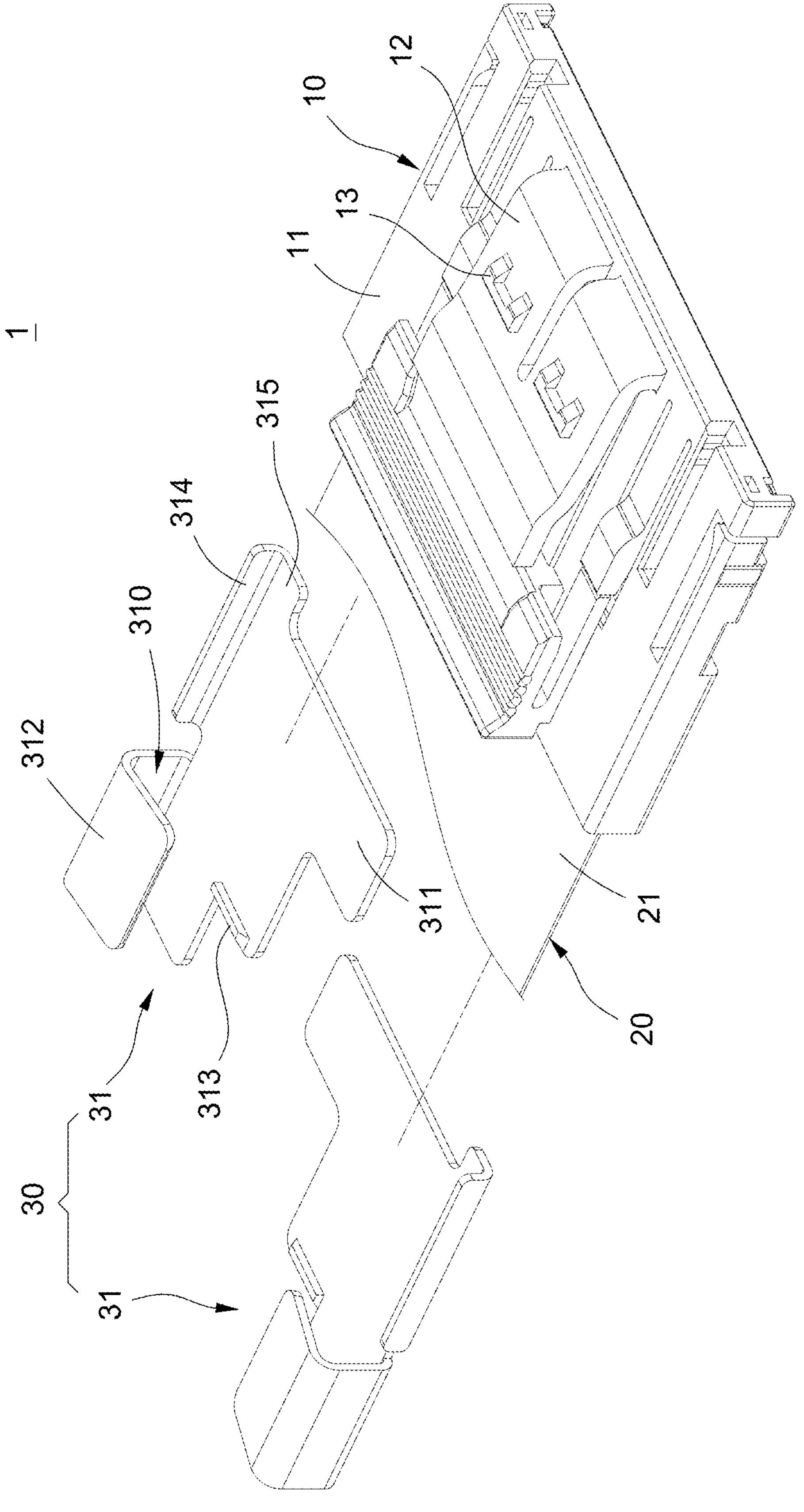
FIG. 3 and FIG. 4 are perspective exploded schematic views from two sides of the connection cable in this disclosure.
Figure 4:
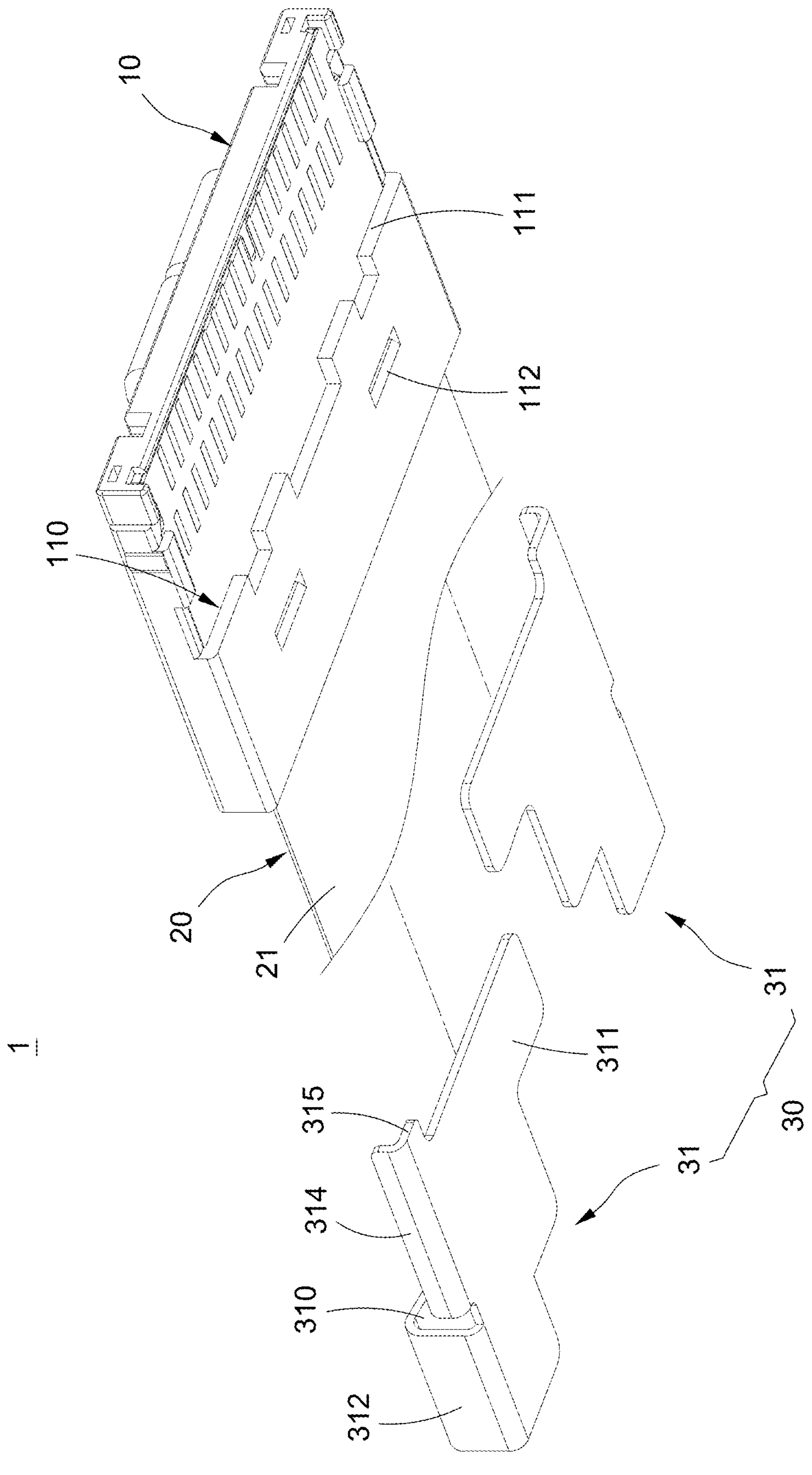
Figure 5:
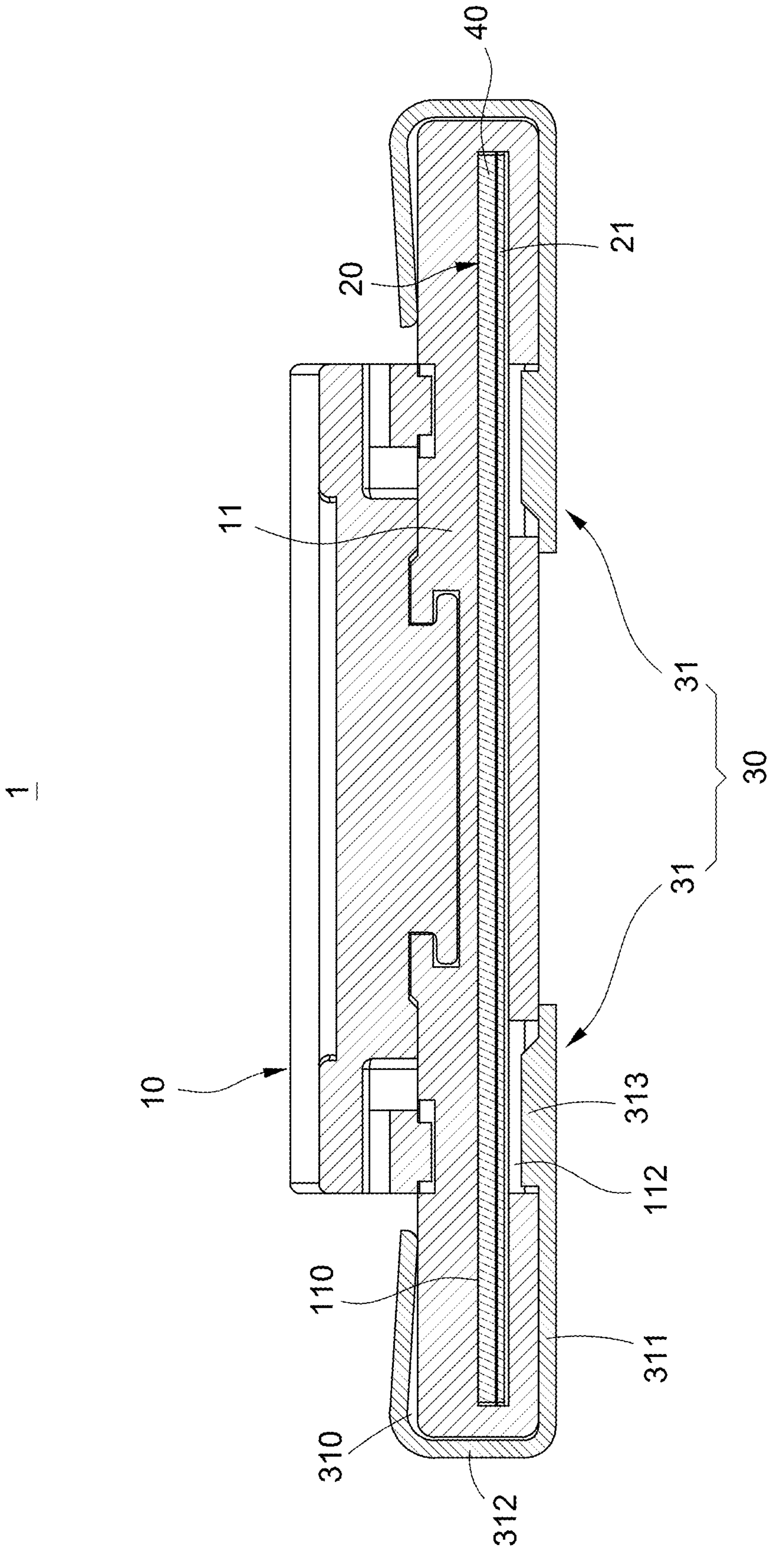
FIG. 5 is a cross-sectional view of the connection cable in this disclosure.

Please further refer to FIG. 3 to FIG. 5, they depict perspective exploded schematic views from two sides of the connection cable and a cross-sectional view of the connection cable in this disclosure. The connection cable 1 in this disclosure includes an insulation seat 10, a circuit board 20 and a protection cover 30. The insulation seat 10 includes a main body 11. The main body 11 is formed with a slot 110 and a conduction opening 111 communicating with the slot 110. Additionally, the main body 11 includes an elastic arm 12 and a bump 13 disposed on the elastic arm 12.

The circuit board 20 includes a substrate 21 and a plurality of conductive portions 22 disposed on the substrate 21. The substrate 21 is inserted in the slot 110. The conductive portions 22 are exposed from the conduction opening 111. In this embodiment, the substrate 21 is a flexible substrate, and each conductive portion 22 is, but not limited to, a gold finger. Moreover, the protection cover 30 is slidably coupled to the main body 11 to cover the conduction opening 111.

It should be noted that in this embodiment, two rows of conductive portions 22 are arranged spacedly on the substrate 21. Moreover, the protection cover 30 covers the conduction opening 111 to shield most of the conductive portions 22 and expose only the ends of the conductive portions 22.

In this embodiment, the protection cover 30 includes two sliding covers 31 arranged side by side. Each sliding cover 31 includes a shutter 311 and a clasp arm 312 connected to the shutter 311. The clasp arm 312 that is bent and extends from one side of the shutter 311 and forms an insertion space 310. Additionally, both sides of the main body 11 are inserted in the insertion spaces 310 of two sliding covers 31 and are secured (pressed) by the clasp arms 312.

It is worth noticing that the protection cover 30 may be made of metal or plastic depending on the specific requirements.

Specifically, each sliding cover 31 includes a hook 313 disposed on a side facing the insertion space 310 thereof. A plurality of grooves 112 are disposed on the bottom side of the main body 11. Each sliding cover 31 is positioned on the main body 11 through the hook 313 being engaged with the groove 112.

Furthermore, each sliding cover 31 includes a baffle 314 that is bent and extends from the shutter 311. The baffle 314 is spaced apart from one side of the clasp arm 312 and extends along the insertion direction of the main body 11 to restrict the slide direction of the insulation seat 10 on the sliding cover 31. Additionally, each sliding cover 31 includes a tab 315, which is connected to the baffle 314 and protrudes from the side of the shutter 311 facing the main body 11.

In one embodiment of this disclosure, the connection cable 1 includes a supporting plate 40. The supporting plate 40 is disposed on one side of the substrate 21 to enhance the structural strength of the substrate 21 (see FIG. 5).

Figure 6:
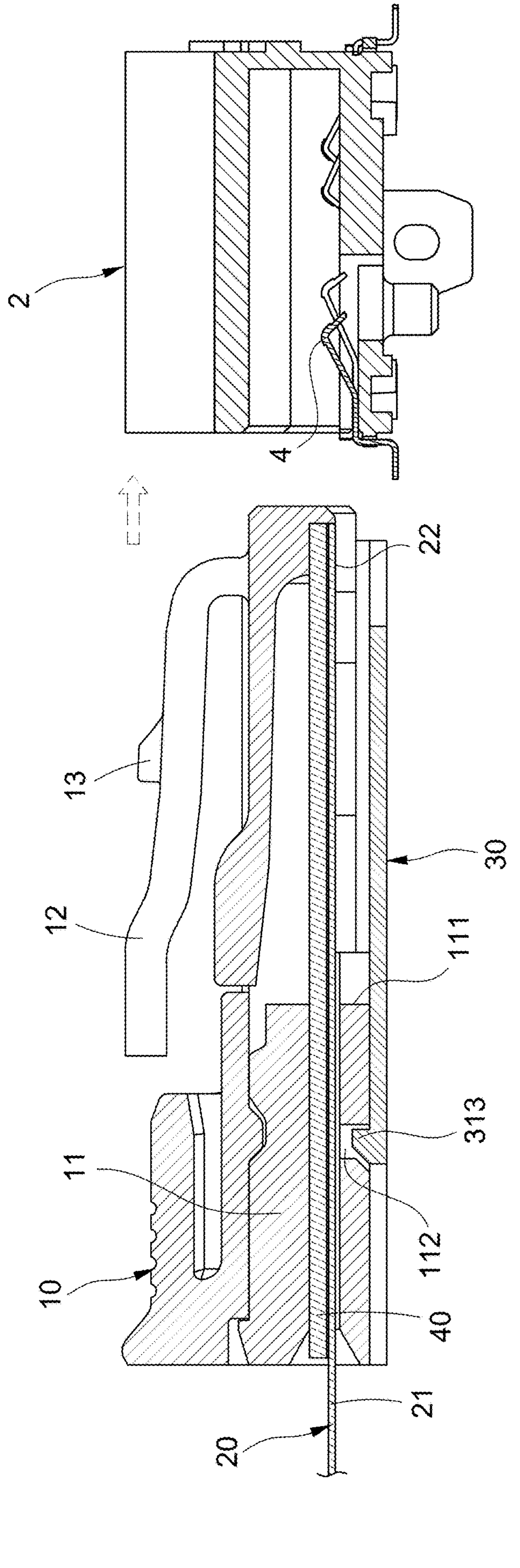
FIG. 6 is a schematic view of the connection cable docking with a dock connector in this disclosure.
Figure 7:
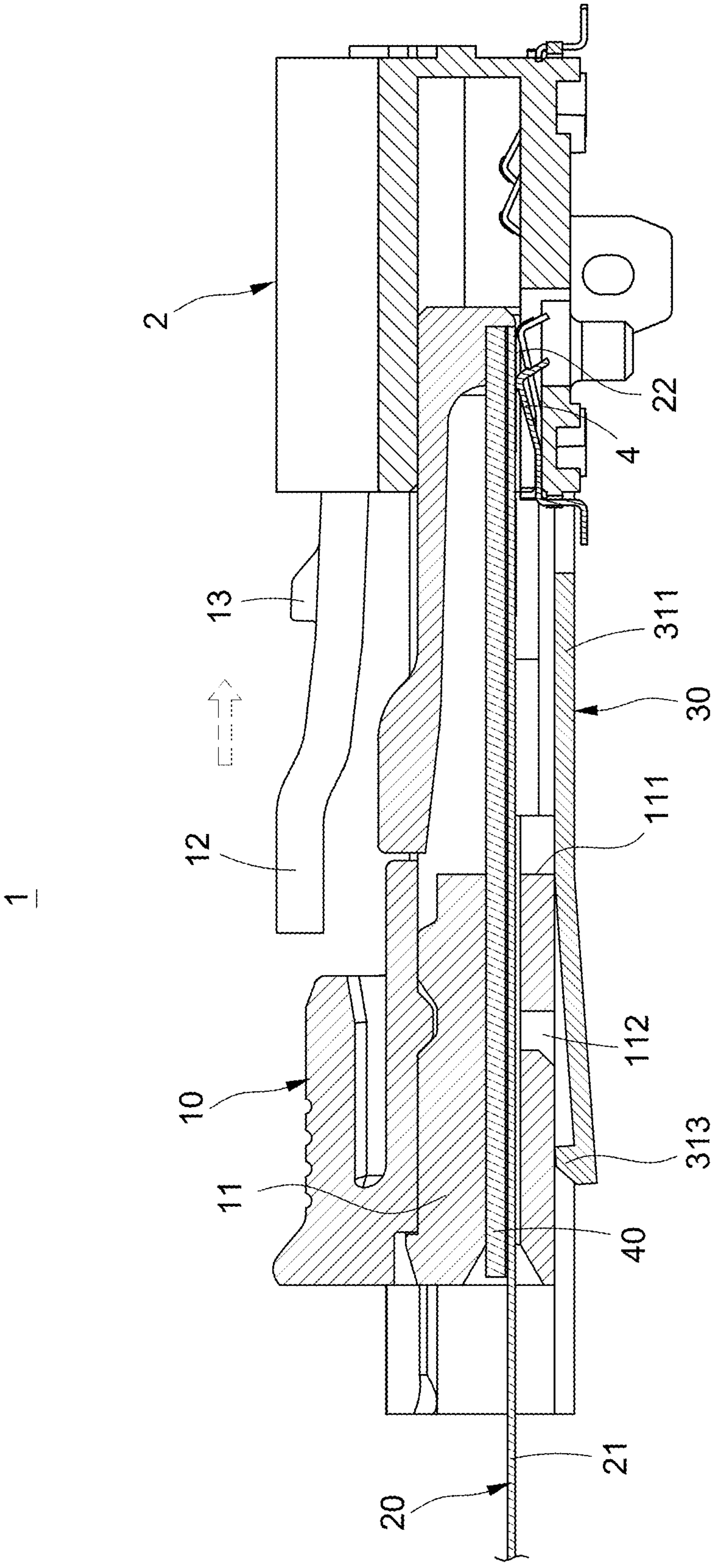
FIG. 7 is a cross-sectional view of the connection cable after docking with a dock connector in this disclosure.
Figure 8:
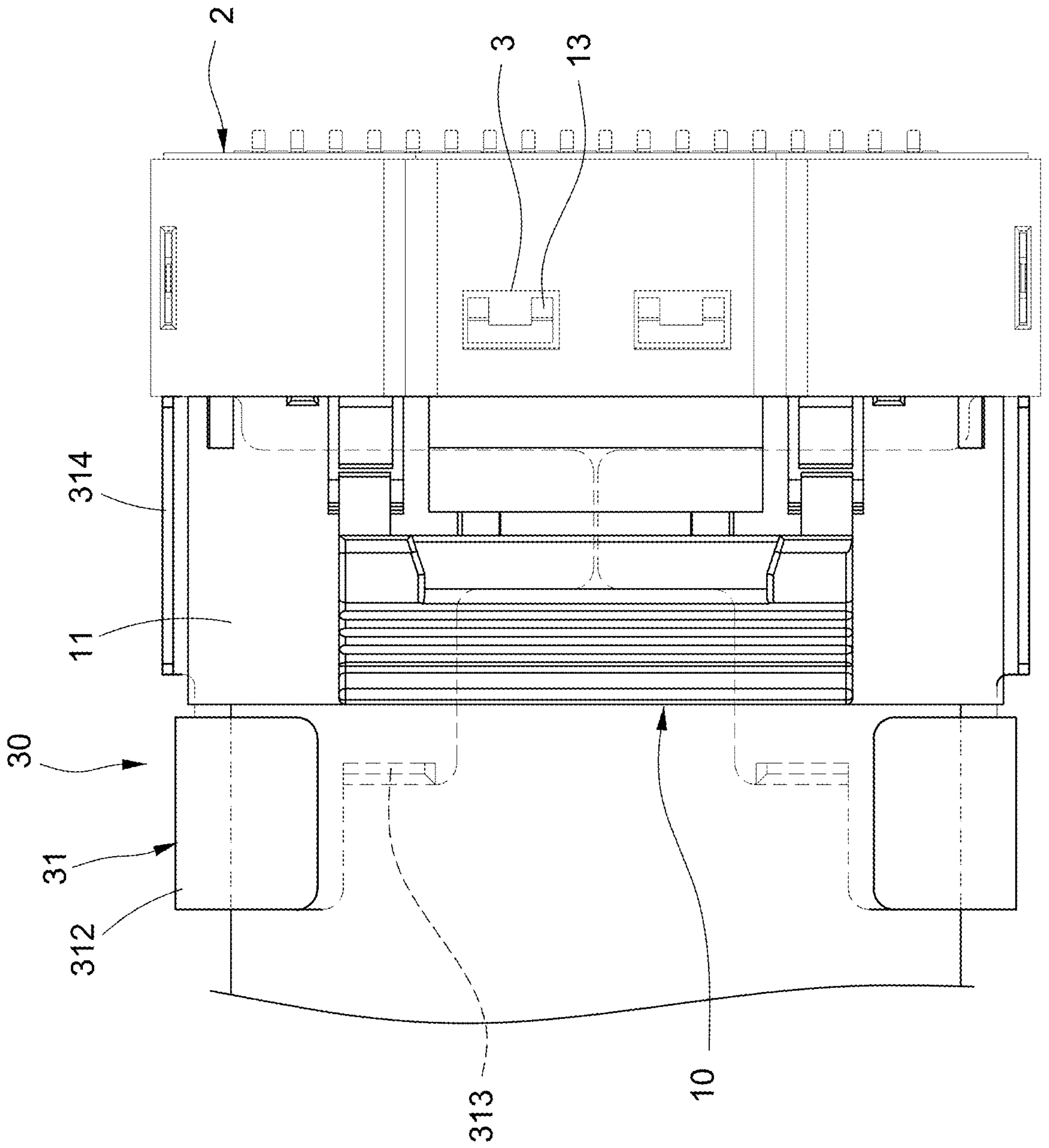
FIG. 8 is a top schematic view of the connection cable after docking with a dock connector in this disclosure.

Please further refer to FIG. 6 to FIG. 8, which depict a schematic view of the connection cable docking with a dock connector in this disclosure, a cross-sectional view of the connection cable after docking with a dock connector in this disclosure, and a top schematic view of the connection cable after docking with a dock connector in this disclosure. As depicted in FIG. 6, the connection cable 1 is designed to be docked with a dock connector 2 with multiple terminals 4. When the connection cable 1 is inserted into the dock connector 2, the elastic arm 12 may be compressed, moving it towards the main body 11. The connection cable 1 is securely connected to the dock connector 2 through the bump 13 snapping into the card slot 3 to (see also FIG. 1).

As shown in FIG. 7 and FIG. 8, when the main body 11 of the connection cable 1 is inserted into the dock connector 2, the protection cover 30 is pushed by the dock connector 2. Specifically, the dock connector 2 exerts pressure on the tabs 315 of each sliding cover 31 to make the hooks 313 of each sliding cover 31 disengage from the grooves 112 on the main body 11.

Accordingly, the protection cover 30 may be detached from the insulation seat 10 to reveal the conduction opening 111. Subsequently, the conductive portions 22 located within the conduction opening 111 are connected to the terminals 4 of the dock connector 2 to achieve the purpose of electric connection or data transmission.

It should be noted that the protection cover 30 may be configured as a disposable protection cover 30. Moreover, the protection cover 30 consists of two sliding covers 31 arranged side by side without interconnection. Therefore, the two sliding covers 31 may be automatically separated when being detached from the insulation seat 10. Therefore, there is no need to remove the protection cover 30 from the insulation seat 10.

In this embodiment, the protection cover 30 is disposed to cover the main body 11 and protect the conductive portions 22 of the circuit board 20. The protection cover 30 protect the conductive portions 22 of the circuit board 20 not only when the connection cable 1 is undocked but also during the process of insertion into the dock connector 2.

Figure 9:
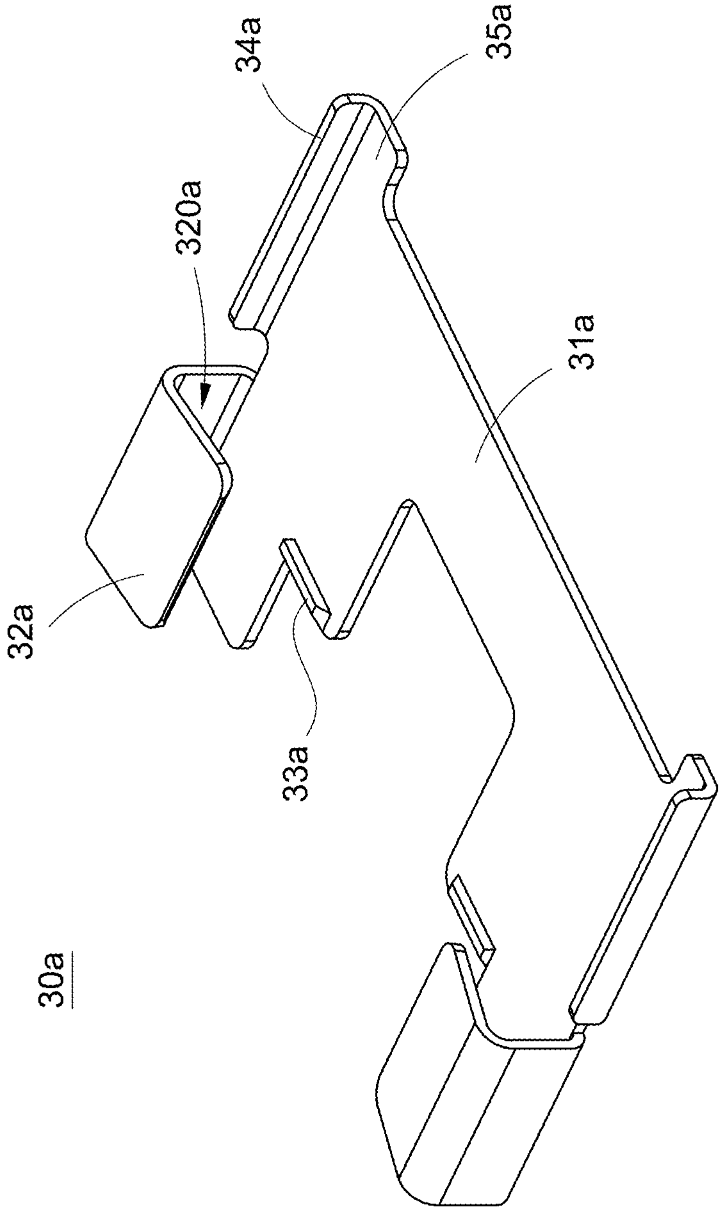
FIG. 9 to FIG. 11 depict alternative embodiments of the protection cover in this disclosure.
Figure 10:
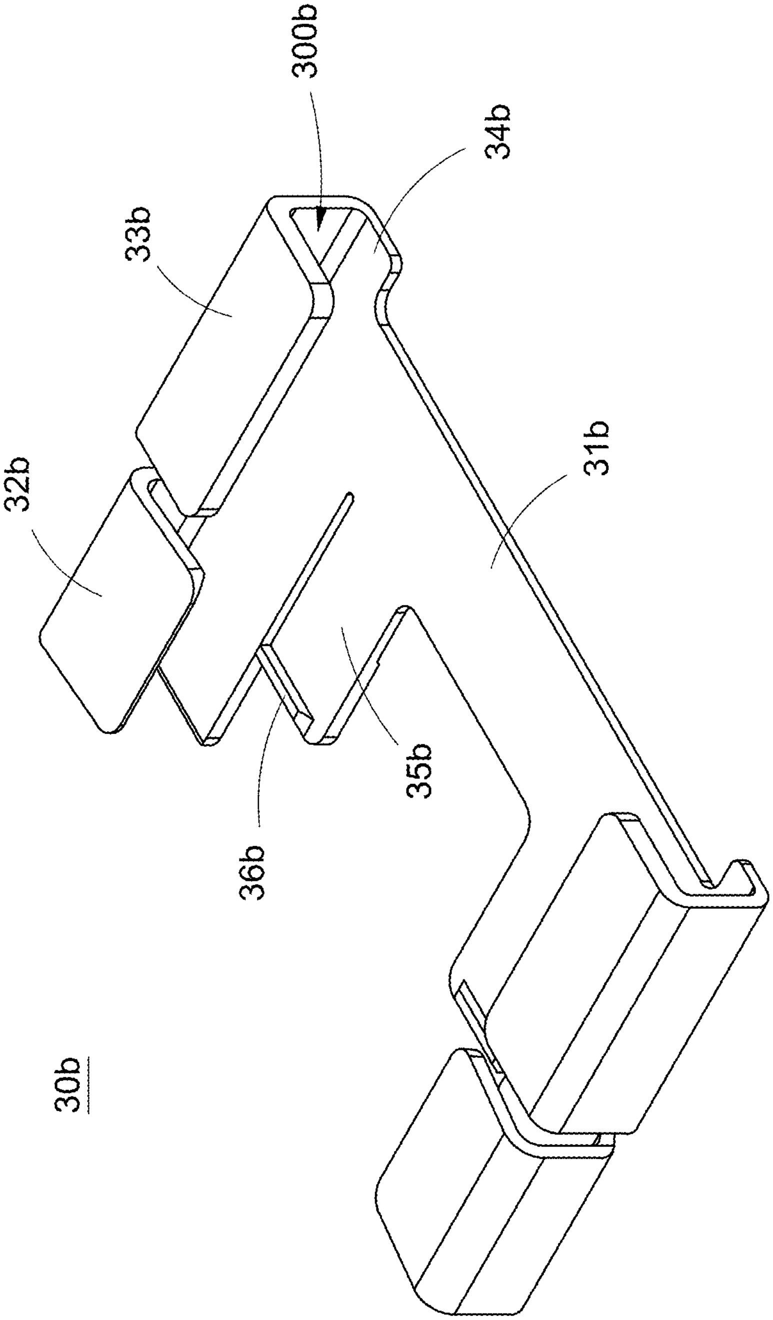
Figure 11:
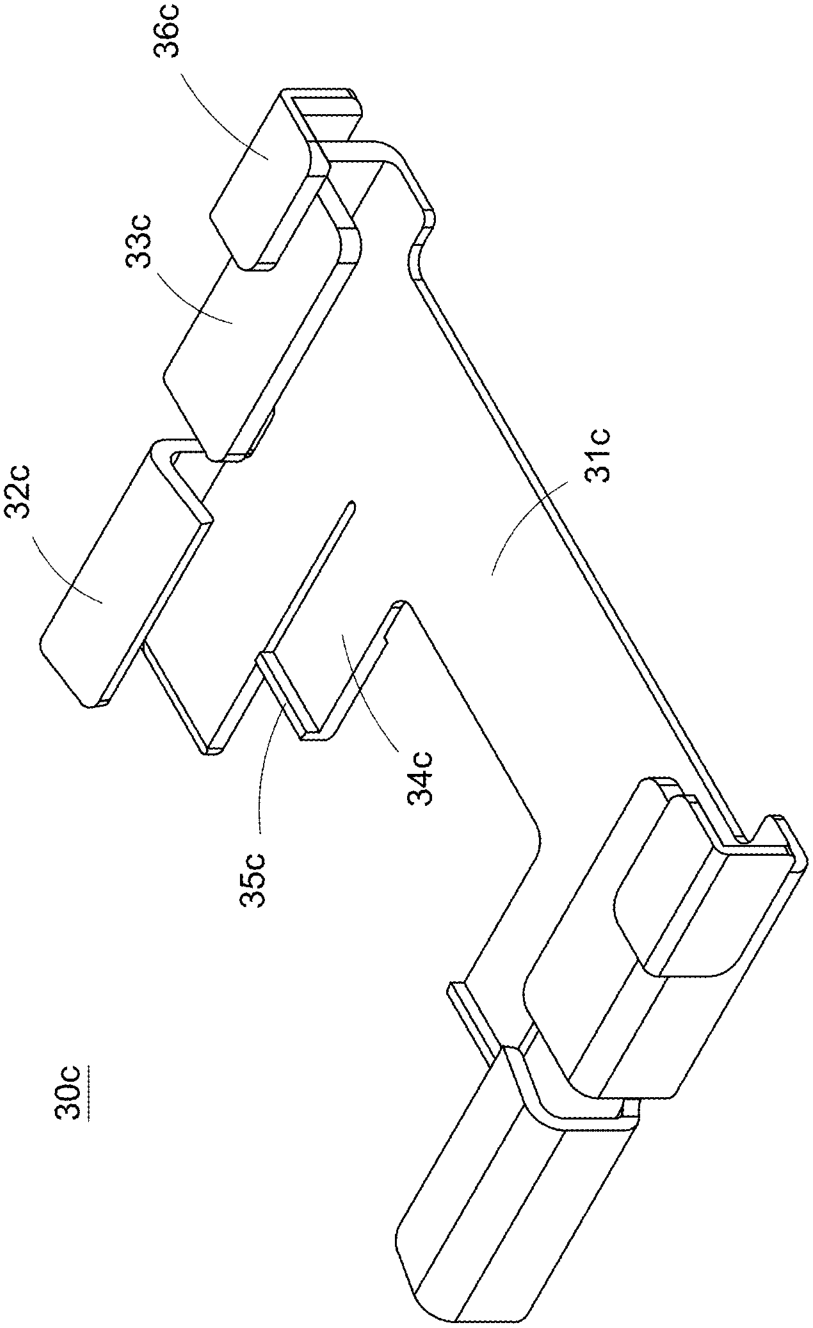

Please further refer to FIG. 9 to FIG. 11, which illustrate alternative embodiments. As depicted in FIG. 9, the protection cover 30*a* of this embodiment includes a shutter 311*a* and two clasp arms 312*a* connected to the shutter 311*a*. Each of the clasp arms 32*a* is bent and extends from one side of the shutter 31*a* to form an insertion space 310*a*. Consequently, both sides of the main body 11 are inserted into the insertion spaces 320*a* and secured (pressed) by the two clasp arms 32*a* (also refer to the combination schematic view in FIG. 5).

In this embodiment, the protection cover 30*a* further includes multiple hooks 33*a*, two baffles 34*a* and two tabs 35*a*. Furthermore, the structures and arrangement of the hooks 33*a*, baffles 34*a* and tabs 35*a* are similar to those in the previous embodiment. The description is omitted for brevity.

As shown in FIG. 10, the protection cover 30*b* in this embodiment includes a shutter 31*b*, two clasp arms 32*b* connected to the shutter 31*b*, two blocking frames 33*b* and two tabs 34*b*. Each clasp arm 32*b* and blocking frame 33*b* is bent and extends from one side of the shutter 31*b* to collectively form an insertion space 300*b*. Moreover, the structures and arrangement of the clasp arms 32*b* and the tabs 34*b* are similar to that in the previous embodiment, and the description is omitted here for brevity. The blocking frames 33*b* are disposed to restrict the slide direction of the insulation seat 10 on the sliding cover 31*b*, facilitating the assembly of the protective cover 30*b* and the insulation seat 10.

In this embodiment, the protection cover 30*b* includes two elastic pieces 35*b* connected to the shutter 31*b*. Each elastic piece 35*b* includes a hook 36*b* disposed for positioning the aforementioned main body 11. The arrangement of the elastic piece 35*b* facilitates the hook 36*b* disengaging from the positioning of the aforementioned main body 11.

Please refer to FIG. 11, the protection cover 30*c* of this embodiment includes a shutter 31*c*, two clasp arms 32*c* connected to the shutter 31*c* and two blocking frames 33*c*. Additionally, the protection cover 30*c* includes two elastic pieces 35*b* connected to the shutter 31*c*. Each elastic piece 34*c* includes a hook 35*c* disposed for positioning the aforementioned main body 11. The structures and arrangement of the clasp arms 32*c*, blocking frames 33*c*, elastic pieces 34*c* and hooks 35*c* are similar to those in the previous embodiment, and the description is omitted here for brevity.

In this embodiment, the protection cover 30*c* includes two guiding pieces 36*c* arranged on two blocking frames 33*c*. One side of each guiding piece 36*c* protrudes from the side of each blocking frame 33*c*. The guiding piece 36*c* is disposed to guide the connection cable 1 when it is inserted into the dock connector 2, facilitating the connection of the connection cable 1 and the dock connector 2.

While this disclosure has been described by means of specific embodiments, numerous modifications and variations could be made thereto by those skilled in the art without departing from the scope and spirit of this disclosure set forth in the claims.

What is claimed is:

1. A connection cable (1) configured to be docked with a dock connector (2), the connection cable (1) comprising:

an insulation seat (10), comprising a main body (11), the main body (11) comprising a slot (110) and a conduction opening (111), wherein the conduction opening (111) communicates with the slot (110) and is located on a bottom side of the main body (11);

a circuit board (20), comprising a substrate (21) and a plurality of conductive portions (22) disposed on the substrate (21), wherein the substrate (21) is inserted in the slot (110), and the conductive portions (22) are exposed from the conduction opening (111); and a protection cover (30), combined on the main body (11) to shield the conduction opening (111);

wherein, the protection cover (30) is configured to be pushed by the dock connector (2) to be separated from the main body (11) to expose the conduction opening (111);

wherein the protection cover (30) comprises two sliding covers (31) arranged side by side, each sliding cover (31) comprises a shutter (311) and a clasp arm (312) connected to the shutter (311), wherein the clasp arm (312) is bent and extends from one side of the shutter (311) to define an insertion space (310), and two sides of the main body (11) are inserted in the insertion space (310) of the two sliding covers (31) and are pressed by the clasp arms (312).

2. The connection cable (1) according to claim 1, wherein each sliding cover (31) comprises a hook (313) disposed on a side thereof facing the insertion space (310), a plurality of grooves (112) is defined on a bottom side of the main body (11), and each sliding cover (31) is positioned on the main body (11) through the hook (313) being engaged with the groove (112).

3. The connection cable (1) according to claim 1, wherein each sliding cover (31) comprises a baffle (314) bent and extending from the shutter (311), the baffle (314) is spaced apart from one side of the clasp arm (312) and extends along an insertion direction of the main body (11).

4. The connection cable (1) according to claim 3, wherein each sliding cover (31) comprises a tab (315) connected to the baffle (314) and protruding from a side of the shutter (311) facing the main body (11).

5. The connection cable (1) according to claim 1, wherein the protection cover (30) comprises a shutter (311) and two clasp arms (312) connected to the shutter (311), wherein each clasp arm (312) is bent and extends from one side of the shutter (311) to define an insertion space (310), and the main body (11) is inserted in the insertion space (310) and pressed by the two clasp arms (312).

6. The connection cable (1) according to claim 5, wherein the protection cover (30) comprises a plurality of hooks (313) disposed on a side thereof facing the insertion space (310), a plurality of grooves (112) is defined on a bottom side of the main body (11), and the protection cover (30) is positioned on the main body (11) through the hooks (313) being engaged with the grooves (112).

7. The connection cable (1) according to claim 6, wherein the protection cover (30*b*) comprises two elastic plates (35*b*) connected to the shutter (31*b*), and the hooks (36*b*) are disposed on the two elastic plates (35*b*).

8. A connection cable (1) configured to be docked with a dock connector (2), the connection cable (1) comprising:

an insulation seat (10), comprising a main body (11), the main body (11) comprising a slot (110) and a conduction opening (111), wherein the conduction opening (111) communicates with the slot (110) and is located on a bottom side of the main body (11);

a circuit board (20), comprising a substrate (21) and a plurality of conductive portions (22) disposed on the substrate (21), wherein the substrate (21) is inserted in the slot (110), and the conductive portions (22) are exposed from the conduction opening (111); and a protection cover (30), combined on the main body (11) to shield the conduction opening (111);

wherein, the protection cover (30) is configured to be pushed by the dock connector (2) to be separated from the main body (11) to expose the conduction opening (111);

wherein, the protection cover (30) comprises a shutter (311) and two clasp arms (312) connected to the shutter (311), wherein each clasp arm (312) is bent and extends from one side of the shutter (311) to define an insertion space (310), and the main body (11) is inserted in the insertion space (310) and pressed by the two clasp arms (312);

wherein the protection cover (30) comprises two baffles (314) bent and extending from the shutter (31), the two baffles (314) are spaced apart from one side of the two clasp arms (312) and extends along an insertion direction of the main body (11).

9. The connection cable (1) according to claim 8, wherein the protection cover (30*a*) comprises two tabs (35*a*) connected to the two baffles (34*a*) and protruding from a side of the shutter (31*a*) facing the main body (11).

10. A connection cable (1) configured to be docked with a dock connector (2), the connection cable (1) comprising:

an insulation seat (10), comprising a main body (11), the main body (11) comprising a slot (110) and a conduction opening (111), wherein the conduction opening (111) communicates with the slot (110) and is located on a bottom side of the main body (11);

a circuit board (20), comprising a substrate (21) and a plurality of conductive portions (22) disposed on the substrate (21), wherein the substrate (21) is inserted in the slot (110), and the conductive portions (22) are exposed from the conduction opening (111); and a protection cover (30), combined on the main body (11) to shield the conduction opening (111);

wherein, the protection cover (30) is configured to be pushed by the dock connector (2) to be separated from the main body (11) to expose the conduction opening (111);

wherein, the protection cover (30) comprises a shutter (311) and two clasp arms (312) connected to the shutter (311), wherein each clasp arm (312) is bent and extends from one side of the shutter (311) to define an insertion space (310), and the main body (11) is inserted in the insertion space (310) and pressed by the two clasp arms (312);

wherein the protection cover (30*b*) comprises two blocking frames (33*b*) bent and extending from the shutter (31*b*), the two blocking frames (33*b*) are spaced apart from one side of the two clasp arms (32*b*), and each blocking frame (33*b*) and each clasp arm (32*b*) collectively define an insertion space (300*b*).

11. The connection cable (1) according to claim 10, wherein the protection cover (30*c*) comprises two guiding pieces (36*c*) arranged on the two blocking frames (33*c*), and one side of each guiding piece (36*c*) protrudes from one side of each blocking frame (33*c*).

* * * * *